US012671780B2

(12) United States Patent (10) Patent No.: US 12,671,780 B2
Shirasaka (45) Date of Patent: Jun. 30, 2026

(54) INSPECTION DEVICE AND INSPECTION METHOD

(71) Applicant: TOYO SEIKAN CO., LTD., Tokyo (JP)

(72) Inventor: Tatsuya Shirasaka, Kanagawa (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 295 days.

(21) Appl. No.: 18/388,018

(22) Filed: Nov. 8, 2023

(65) Prior Publication Data

US 2024/0073348 A1      Feb. 29, 2024

Related U.S. Application Data

(63) Continuation of application No. PCT/JP2022/007325, filed on Feb. 22, 2022.

(30) Foreign Application Priority Data

May 13, 2021     (JP) ................................. 2021-081475

(51) Int. Cl.
| | |
|---|---|
| *G01N 21/90* | (2006.01) |
| *B41J 3/407* | (2006.01) |
| *G01N 21/95* | (2006.01) |
| *H04N 1/60* | (2006.01) |
| *G01N 21/952* | (2006.01) |

(52) U.S. Cl.
CPC ........ *H04N 1/6005* (2013.01); *B41J 3/40733* (2020.08); *H04N 1/608* (2013.01)

(58) Field of Classification Search
CPC ....... H04N 1/6005; H04N 1/608; G01N 21/90

USPC .......................................................... 382/167
See application file for complete search history.

(56) References Cited

U.S. PATENT DOCUMENTS

| | | | |
|---|---|---|---|
| 2012/0216689 A1 | 8/2012 | Cochran et al. | |
| 2018/0093496 A1 | 4/2018 | Izume | |
| 2018/0195974 A1* | 7/2018 | Kress | ................... H04N 23/957 |
| 2019/0283445 A1* | 9/2019 | Sones | ................. B41J 11/0095 |

FOREIGN PATENT DOCUMENTS

| | | |
|---|---|---|
| JP | 9-62831 A | 3/1997 |
| JP | 9-096613 | 4/1997 |
| JP | 9-300596 | 11/1997 |

(Continued)

OTHER PUBLICATIONS

English Translated ISR cited in corresponding International Appln. No. PCT/JP2022/007325 dated Apr. 14, 2022.

(Continued)

*Primary Examiner* — Jamie J Atala
(74) *Attorney, Agent, or Firm* — BACON&THOMAS, PLLC

(57) ABSTRACT

There is provided an inspection device configured to inspect a printed state of an inspected object surface which is a printed metallic base. The inspection device includes: a processor; and a memory connected to the processor to be able to communicate with the processor, the processor being configured to: acquire inspection image data obtained by imaging the inspected object surface; measure an $L^*$ value for each of colors in an $L^*a^*b^*$ colorimetric system of the inspection image data; and inspect the printed state of the inspected object surface based on the $L^*$ value.

8 Claims, 8 Drawing Sheets

(56)          References Cited

FOREIGN PATENT DOCUMENTS

| JP | 10-232933 | A | 9/1998 |
| JP | 2002-286549 | A | 10/2002 |
| JP | 2004-257929 | A | 9/2004 |
| JP | 2007-010475 | A | 1/2007 |
| JP | 2007-198963 | A | 8/2007 |
| JP | 2013-544675 | A | 12/2013 |
| JP | 2015-223717 | A | 12/2015 |
| JP | 7-128240 | B2 | 8/2022 |
| WO | WO2015/046119 | A1 | 4/2015 |
| WO | WO2015114833 | A1 | 8/2015 |

OTHER PUBLICATIONS

Japanese First OA (Notice of Reasons for Refusal) and its machine translation.
Japanese Second OA (Notice of Reasons for Refusal) and its machine translation.

* cited by examiner

WHITE

YELLOW

GOLD

ORANGE

RED

CRIMSON

INSPECTION DEVICE AND INSPECTION METHOD

CROSS-REFERENCE TO RELATED APPLICATIONS

The present application is a continuation application of PCT international application No. PCT/JP2022/007325 filed on Feb. 22, 2022 which claims priority from Japanese Patent Application No. 2021-081475 filed on May 13, 2021, and the entire contents of which are hereby incorporated by reference.

BACKGROUND

1. Technical Field

The present invention relates to an inspection device and an inspection method.

2. Related Art

Conventionally, there has been known an inspection device configured to inspect an image printed on a printed subject. For example, see International Publication No. 2015/114833. The entire contents of this disclosure are hereby incorporated by reference.

International Publication No. 2015/114833 discloses an image inspection device configured to inspect an image by comparing first image data as the inspection standard with second image data as an inspected object, and detecting color difference ΔE in hue between the first image data and second image data.

SUMMARY

An aspect of the invention provides an inspection device configured to inspect a printed state of an inspected object surface which is a printed metallic base, the inspection device includes: a processor; and a memory connected to the processor to be able to communicate with the processor, the processor being configured to: acquire inspection image data obtained by imaging the inspected object surface; measure an L* value for each of colors in an L*a*b* colorimetric system of the inspection image data; and inspect the printed state of the inspected object surface based on the L* value.

DETAILED DESCRIPTION

The hue and the color density of the image printed on the printed subject vary depending on the material and the color of the base (printed surface), the type of ink, and the film thickness. For printing, when the ink is transferred to, for example, a metal surface, the color (color density) varies depending on the film thickness of the ink on the printed surface.

When the printed state of the printed metal surface is inspected, it may not be possible to correctly get the printed state based on the detected color difference ΔE between a standard image as the inspection standard obtained by imaging the printed surface and an inspection image obtained by imaging the inspected object surface. That is, the correlation between the color difference ΔE and the film thickness varies for each of the colors, and therefore, it may be impossible for some colors to determine the difference between the film thickness of the printed surface as the standard and the film thickness of the inspected object surface, based on the color difference ΔE. Consequently, it is not possible to correctly get the printed state of the printed surface (the inspected object surface) by the inspection based on the color difference ΔE between the standard image and the inspected image as disclosed in International Publication No. 2015/114833.

The present invention has been achieved considering the above-described circumstances to address the above-described problem. It is therefore an aspect of the object of the invention to correctly get the printed state (the film thickness of the ink) of the inspected object surface.

Hereinafter, embodiments of the invention will be described with reference to the drawings. The same reference numbers in the different drawings indicate the same functional sections, and therefore repeated description for each of the drawings is omitted.

Figure 1:
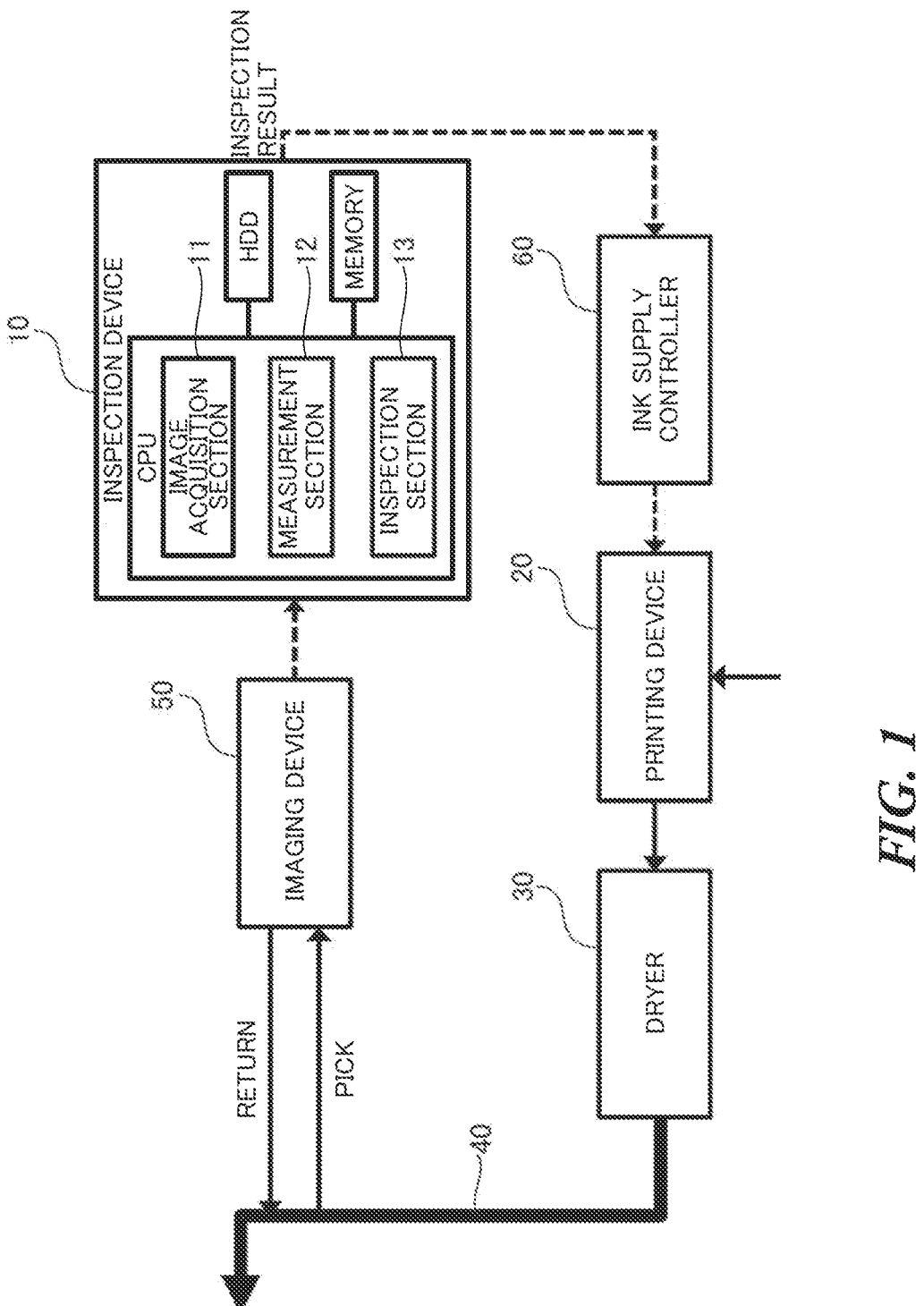
FIG. 1 illustrates the configuration of a printing system including an inspection device according to an embodiment.

FIG. 1 illustrates the schematic configuration of a printing system 1 including an inspection device 10 according to an embodiment of the invention.

In the printing system 1 illustrated in FIG. 1, in the process of conveying a printed matter printed by a printing device 20, the printed state of the printed matter optionally picked from a conveyance path is inspected, and the inspection result is reflected in the printing process to maintain the printing quality.

The printing system 1 includes: the printing device 20 configured to print a printed subject in a predetermined manner; a dryer 30 configured to dry the ink on a printed matter printed by the printing device 20; a conveyance device 40 configured to convey the printed matter; an imaging device 50 configured to optionally pick the printed matter conveyed by the conveyance device 40 and image an inspected object surface of the printed matter; an inspection device 10 configured to inspect the printed state of the inspected object surface, based on inspection image data obtained from the imaging device 50; and an ink supply controller 60 configured to obtain the inspection result from the inspection device 10 and controls the amount of ink supply. Here, in FIG. 1, solid lines indicate the flow of the printed subject and the printed matter, and broken lines indicate the flow of an electric signal.

The printed subject for the printing system 1 is, for example, a can body (including an unfinished can body) such as a two-piece can having an approximately cylindrical shape, or a flat metal plate, and includes the printed surface as the base having a metallic luster. Hereinafter, with the present embodiment, an example of the printing system 1 to print can bodies as printed subjects will be described.

The inspection device 10 inspects an inspected object which is any can body picked from can bodies printed by the printing device 20 and conveyed by the conveyance device 40. As illustrated in FIG. 1, the inspection device 10 includes an image acquisition section 11, a measurement section 12, and an inspection section 13. Details of the inspection device 10 and the function of the inspection device 10 will be described later.

As the printing device 20, for example, an offset printer may be used, which includes a roller group with a plurality of rollers and is configured to transfer inks supplied by the roller group from ink reservoirs via an intermediate transfer member to a can body as a printed subject. Details of the printing device 20 will be described later.

The inks and overcoat have been transferred and applied to the can body by the printing device 20, and the dryer 30 dries the inks and the overcoat to fix them on the can body.

The conveyance device 40 includes, for example, a pin chain conveyor provided on supporting rods disposed at predetermined intervals and configured to endlessly rotate. The conveyance device 40 is configured to convey the can body as a printed subject from the dryer 30 to a predetermined destination.

The imaging device 50 images an inspected object surface which is the printed surface of any can body picked from a plurality of can bodies conveyed by the conveyance device 40. The imaging device 50 images at least two kinds of image data including first image data and second image data. The first image data is obtained by irradiating the inspected object surface with the light emitted from a light source, and receiving the reflected light including regularly reflected light and irregularly reflected light from the inspected object surface by a line sensor of the imaging device 50. Meanwhile, the second image data is obtained by irradiating the inspected object surface with the light emitted from the light source, and receiving only the irregularly reflected light from the inspected object surface by the line sensor of the imaging device 50. The configuration of the imaging device 50 will be described later.

The ink supply controller 60 controls the amount of ink supply, that is, the film thickness of the ink by controlling, for example, a ductor roller of the printing device 20 based on the inspection result of the inspection device 10.

<Inspection Device>

As described above, the inspection device 10 includes the image acquisition section 11, the measurement section 12, and the inspection section 13. A dedicated or general-purpose computer including a CPU, a memory, and an HDD may be applied to the inspection device 10. It is possible to realize the function of each of the sections of the inspection device 10 by loading programs previously stored in the HDD into the memory, and executing the programs by the CPU. In addition, part or all of the functions of the sections may be implemented by hardware such as an ASIC (application specific integrated circuit) and an FPGA (field programmable gate array).

Hereinafter, the functions of the sections of the inspection device 10 will be described. The image acquisition section 11 previously acquires standard image data 81 obtained by imaging a printed surface as the standard for inspection of the printed state, and also acquires inspection image data 82 obtained by imaging the inspected object surface of a can body as an inspected object by the imaging device 50. Here, the standard image data 81 may be previously stored in a storage device (not illustrated) such as the HDD and the memory.

The measurement section 12 measures L* value of each of the colors in the L*a*b* colorimetric system of the inspection image data. For this purpose, the measurement section 12 converts the inspection image data in an RGB space acquired by the image acquisition section 11 into data in an Lab space, and measures the L* value of each of the colors in the L*a*b* colorimetric system by using the converted inspection image data. In addition, the measurement section 12 calculates difference value $\Delta L*$ between the L* value in the L*a*b* colorimetric system of the standard image data and the L* value of the inspection image data. Here, the measurement section 12 may previously measure the L* values in the L*a*b* colorimetric system of the standard image data and store the measured L* values in a storage device (not illustrated).

With the present embodiment, the inspected object surface as the base has a metallic luster, and therefore the first image data obtained by receiving the reflected light including regularly reflected light and irregularly reflected light from the inspected object surface by a line sensor of the imaging device 50 is used as the inspection image data. The first image data obtained by receiving the regularly reflected light allows the L* value of the metallic surface as the base to be increased, and this image data is used as the inspection image data, and therefore it is possible to verify the correlation between the film thickness of the ink and the L* value of the inspected object surface.

That is, as illustrated in FIGS. 2B to 2F, the greater the film thickness of the ink is, the more difficult it is to see the metallic surface as the base through the ink and the farther from the color of the metallic surface, and consequently the lower the L* value is. In contrast, the smaller the film thickness of the ink is, the easier it is to see the metallic surface as the base through the ink, and consequently the higher the L* value is (FIGS. 2A to 2F).

Meanwhile, when the color of the ink is white, the L* value of the white ink is high. Accordingly, when the first image data is used, the L* value does not necessarily depend on the film thickness, and therefore it may be difficult to determine the correlation between the L* value and the film thickness. In this case, the second image data obtained by receiving only the irregularly reflected light from the inspected object surface by the line sensor of the imaging device 50 is used as the inspection image data. The second image data obtained by receiving only the irregularly reflected light is used as the inspection image data, and therefore the L* value of the metallic surface is reduced. By this means, it makes it easy to determine the correlation between the L* value and the film thickness.

Figures 2A, 2B, 2C, 2D, 2E, 2F:
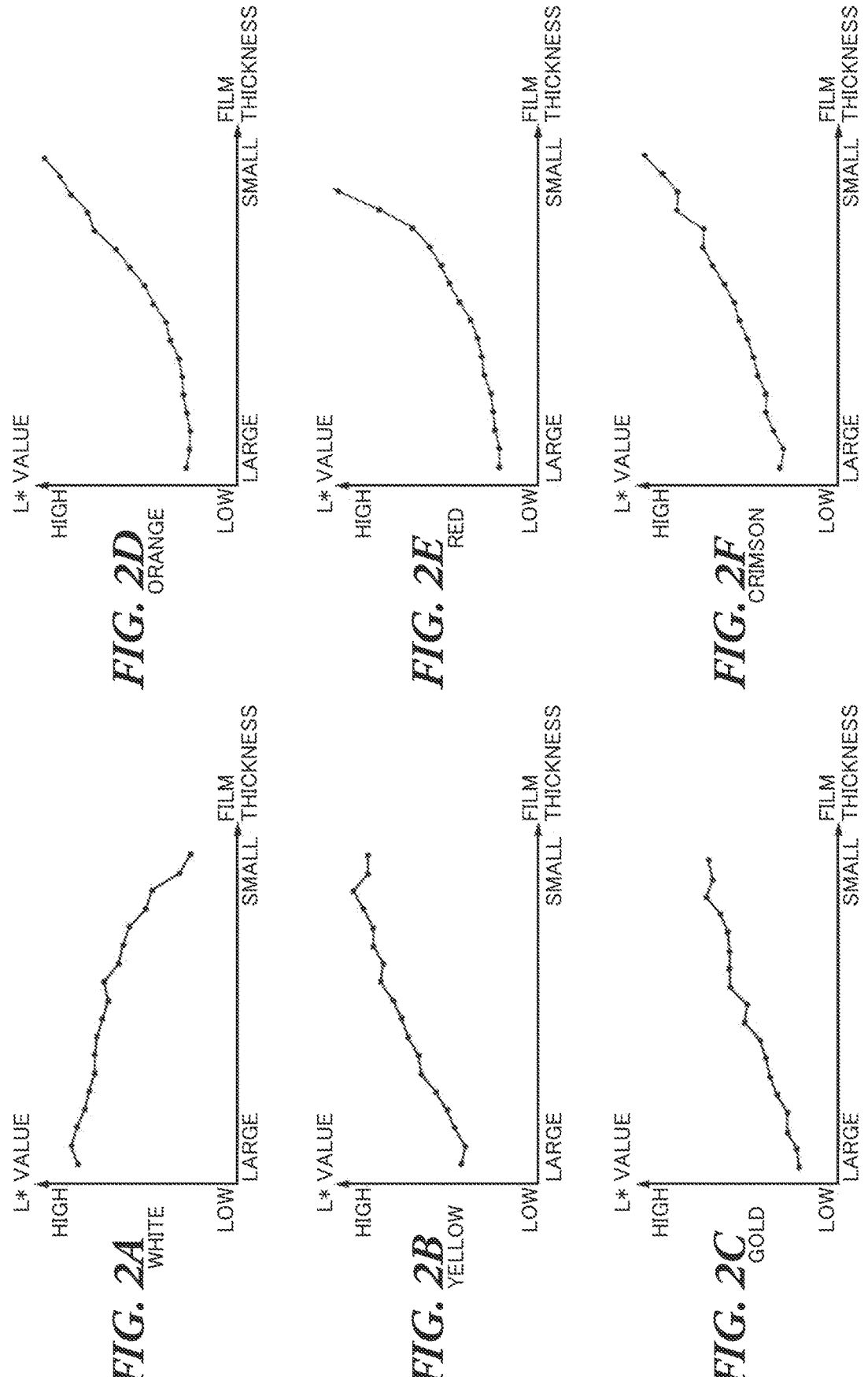
FIGS. 2A to 2F are graphs each illustrating the correlation between the film thickness and L* value for each of the colors of inspection image data.

That is, as illustrated in FIG. 2A, when a region in white is inspected by using the second image data as the inspection image data, the greater the film thickness of the ink is, the more difficult it is to see the metallic surface as the base through the ink and the farther the color of the metallic surface is, and consequently the higher the L* value is. In contrast, the smaller the film thickness of the ink is, the easier it is to see the metallic surface as the base through the ink and the closer to the color of the metallic surface is, and consequently the lower the L* value is.

In this way, for the inspection device 10, it is preferred that appropriate one of the first image data and the second image data is used as the inspection image data, depending on the printed contents (colors) of the inspected object surface. Hereinafter, for the inspection device 10, the image data is not distinguished between the first image data and the second image data, but is simply described as "inspection image data". Here, the use of the second image data is not limited for white, but it is preferred that the second image data is used for colors having the correlation between the L* value measured by using the second image data and the film thickness, in the same way as white.

Figures 3A, 3B, 3C:
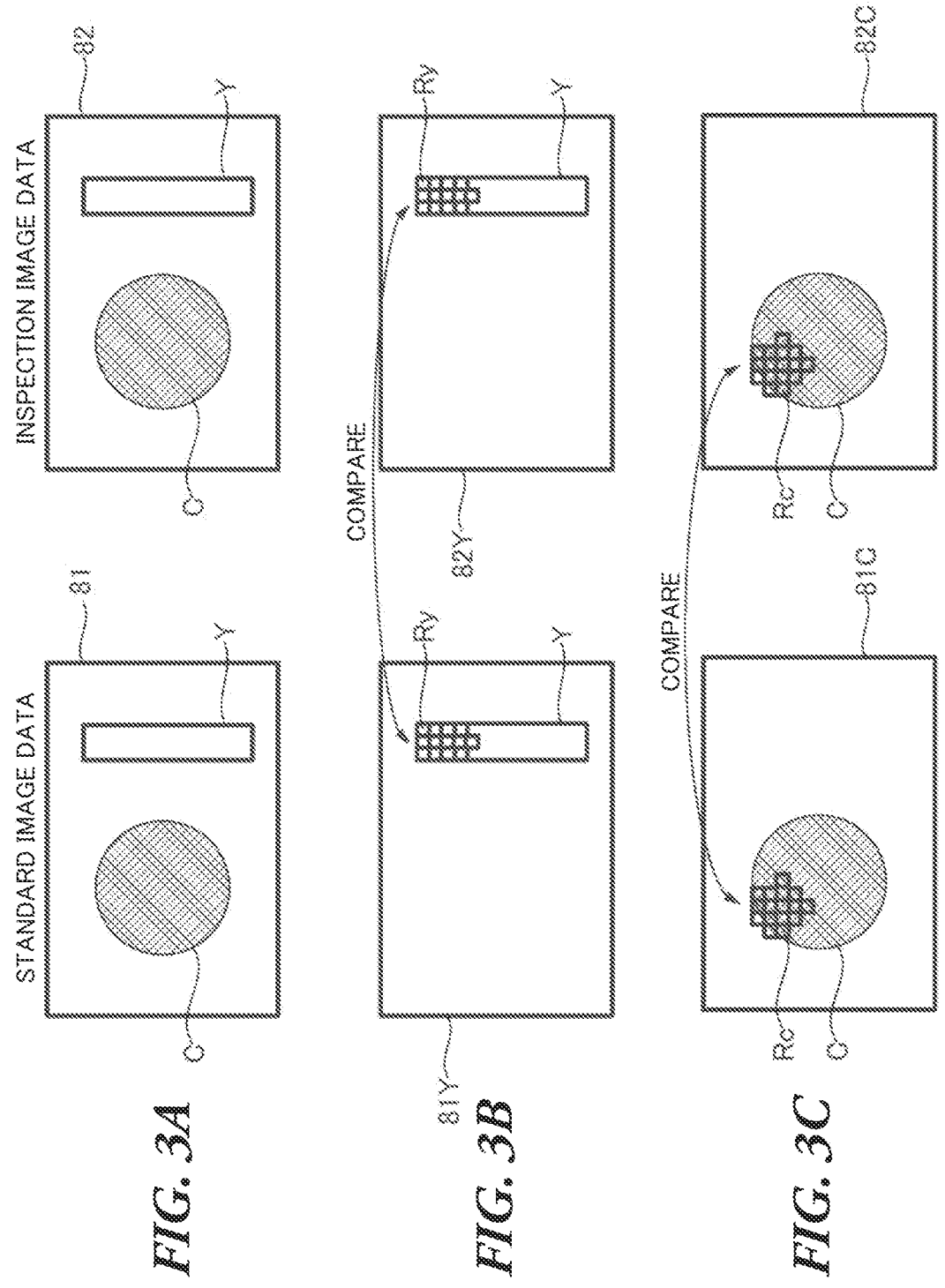
FIGS. 3A to 3C illustrate the inspection of the inspection image data by the inspection device according to the embodiment.

As illustrated in FIGS. 3A to 3C, to measure the L* value of the inspection image data and calculate the difference value ΔL*, the measurement section 12 extracts image data for each of colors from the standard image data 81 and the inspection image data 82 (FIGS. 3B and 3C), and measures the L* value and calculates the difference value ΔL* for each of the colors. With the example illustrated in FIGS. 3A to 3C, the measurement section 12 extracts only the regions in yellow Y from the standard image data 81 and the inspection image data 82, respectively, to extract standard image data 81Y and inspection image data 82Y (FIG. 3B). In addition, the measurement section 12 extracts only the regions in cyan C from the standard image data 81 and the inspection image data 82, respectively, to extract standard image data 81C and inspection image data 82C (FIG. 3C).

Then, the measurement section 12 sets interest regions Ry each having the predetermined number of pixels (for example, three pixels×three pixels) targeted for measuring the L* value in the inspection image data 82Y for each of the colors, and measures the averaged L* value for each of the interest regions Ry. Likewise, the measurement section 12 sets interest regions Rc each having the predetermined number of pixels (for example, three pixels×three pixels) targeted for measuring the L* value in the inspection image data 82C for each of the colors, and measures the averaged L* value for each of the interest regions Rc.

Next, the measurement section 12 calculates the averaged L* value for each of the interest regions in the standard image data 81Y and 81C corresponding to the interest regions Ry and Rc set in the inspection image data 82Y and 82C, respectively, for each of the colors; and calculates the difference value ΔL* between the L* value of the interest region set in the standard image data and the L* value of the interest region set in the inspection image data, for each of the colors. That is, the measurement section 12 measures the L* value for each of the interest regions, and calculates the difference value ΔL* between the L* value of the interest region in the standard image data and the L* value of the interest region in the inspection image data. Here, the difference value ΔL* may be calculated for each of pixels. Otherwise, by averaging the difference values ΔL* for each of the interest regions, it is possible to reduce the effects such as noise in each of the image data. Meanwhile, the L* value of the standard image data may be previously measured before the standard image data is imaged, and the interest regions may be previously set to the standard image data.

Figure 4:
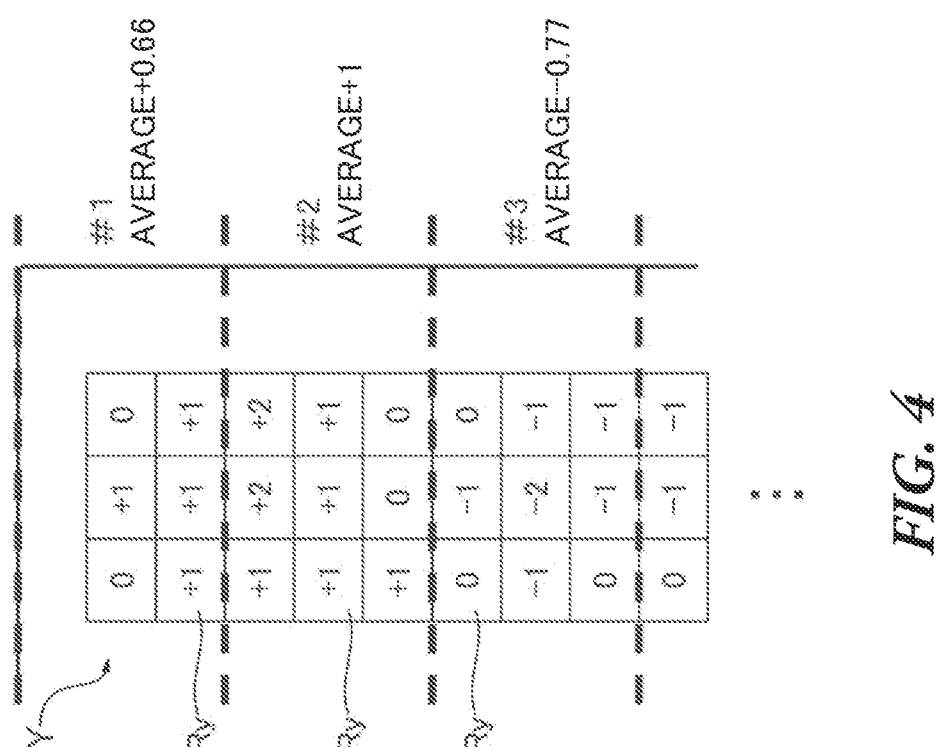
FIG. 4 illustrates the inspection of the inspection image data by the inspection device according to the embodiment.

As the result, the difference value ΔL* for each of the interest regions set to the image data in the yellow Y in the standard image data and the inspection image data is, for example, as illustrated in FIG. 4. In FIG. 4, the region in the yellow Y is divided into a plurality of regions #1, #2, #3 . . . in the vertical direction, and the region #1 includes six interest regions, and the regions #2 and the region #3 include nine interest regions, respectively. In FIG. 4, the difference value ΔL* is given to each of the interest regions for the shake of convenience.

The inspection section 13 inspects the inspected object surface, based on the difference value ΔL* between the L* value of the standard image data and the L* value of the inspection image data. To be more specific, the inspection section 13 calculates the average value of the difference values ΔL* for each of the regions #1, #2, #3 . . . . With the example illustrated in FIG. 4, the average ΔL* value of the region #1 is +0.66, the average ΔL* value of the region #2 is +1, and the average ΔL* value of the region #3 is −0.77. The inspection section 13 inspects the printed state of each of the regions, based on the average ΔL* value of the region #1, the average ΔL* value of the region #2, and the average ΔL* value of the region #3 . . . . The average ΔL* value calculated for each of the regions #1, #2, and #3 . . . is outputted as the inspection result data to the ink supply controller 60. The ink supply controller 60 controls the amount of ink supply (the film thickness of the ink) to cause the average ΔL* value to approximate to 0 for each of the regions #1, #2, and #3 . . . .

Here, the regions #1, #2, and #3 . . . are divided for convenience to correspond to the divided sections of a ductor roller 203 (described later) of the printing device 20. This is because the ductor roller 203 used in the printing device 20 is divided into a plurality of rollers in the axial direction and individually move forward and backward, and therefore it is possible to adjust the amount of ink supply for each of the divided rollers. Accordingly, it is preferred that the inspection section 13 sets the regions #1, #2, and #3 . . . to correspond to the divided rollers of the ductor roller 203 used in the printing device 20 to print the inspected object surface.

<Printing Device>

Figure 5:
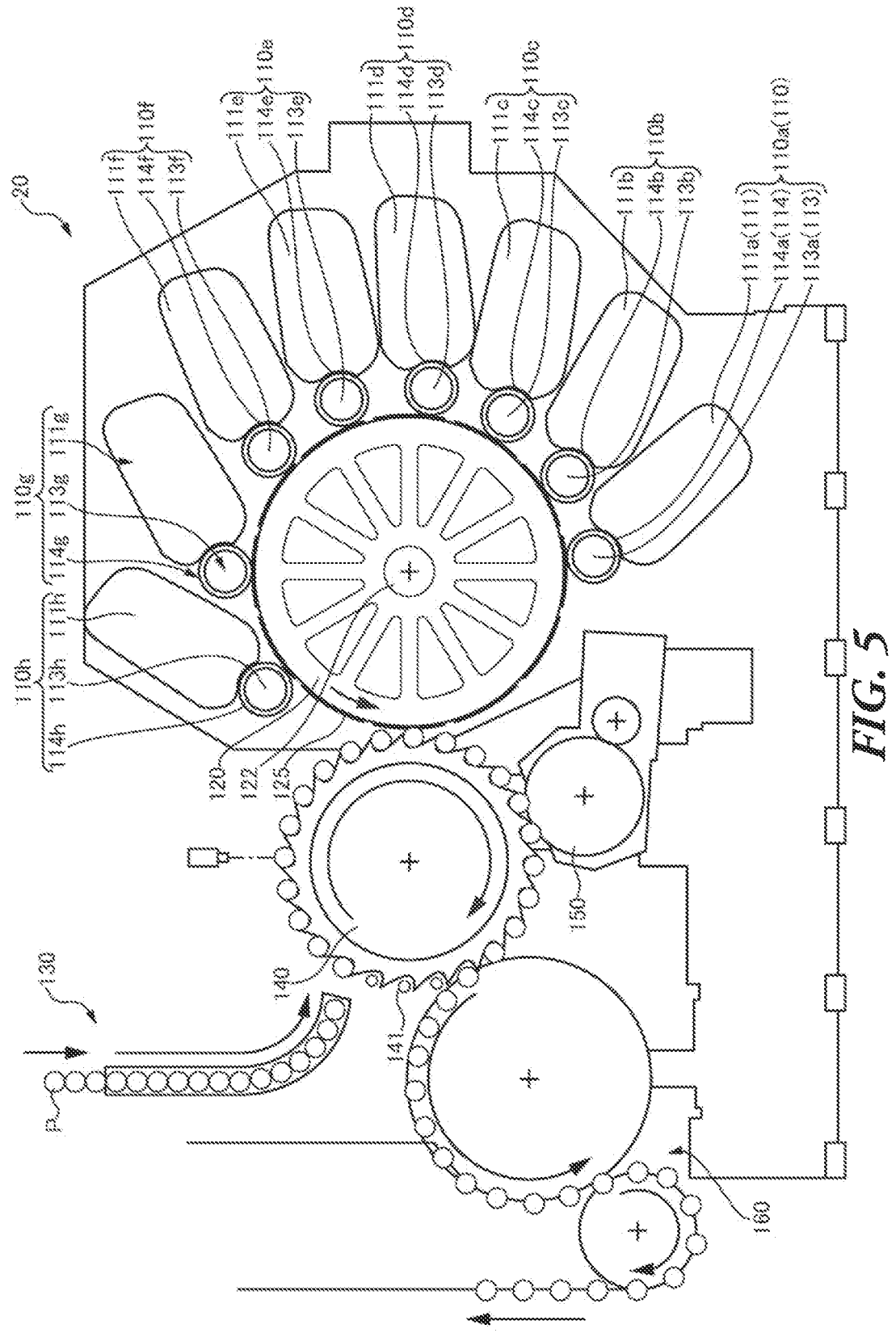
FIG. 5 is an example of a printing device.

As illustrated in FIG. 5, the printing device 20 is an offset printer configured to transfer inks to the outer circumferential surface (outer surface) of a can body (printed subject) P such as a two-piece can having an approximately cylindrical shape to print the can body P.

As illustrated in FIG. 5, the printing device 20 includes an inking units 110 configured to supply inks, a blanket wheel 120 configured to rotate a blanket 125, a conveyance unit 130 configured to convey printed subjects, a mandrel wheel 140 configured to rotate mandrels holding can bodies P, a varnish applicator 150 configured to apply finishing process to the can body P to which the ink is transferred, and a transport unit 160 configured to transport the can body P.

The inking units 110 are devices configured to supply inks to printing plates 114. The inking units 110 are constituted by a plurality of inking units for inks in different colors, respectively, that is, constituted by a first inking unit 110a to an eighth inking unit 110h. These inking units 110 are arranged along the outer circumferential surface of the blanket wheel 120. Each of the inking units 110 includes an ink supply part 111 configured to store a predetermined ink, and a plate cylinder 113 to which the printing plate 114 corresponding to the ink in the ink supply part 111 is mounted.

The plurality of ink supply parts 111 are constituted by a first ink supply part 111a to an eighth ink supply part 111h. The plurality of printing plates 114 are constituted by a first printing plate 114a to an eighth printing prate 114h to which the inks are supplied from the first ink supply part 111a to the eighth ink supply part 111h, respectively. As described above, the plurality of printing plates 114 are manufactured to overprint the colors of the respective inks used for printing. The plate cylinders 113 are constituted by a first plate cylinder 113a to an eighth plate cylinder 113h to which the first printing plate 114a to the eighth printing plate 114h are mounted, respectively.

The plate cylinder 113 has an approximately cylindrical shape and can rotate around a spindle, and the printing plate 114 is detachably mounted to the outer circumferential surface of the plate cylinder 113. The plate cylinder 113 is provided such that the distance from the blanket wheel 20 can be changed.

Figure 6:
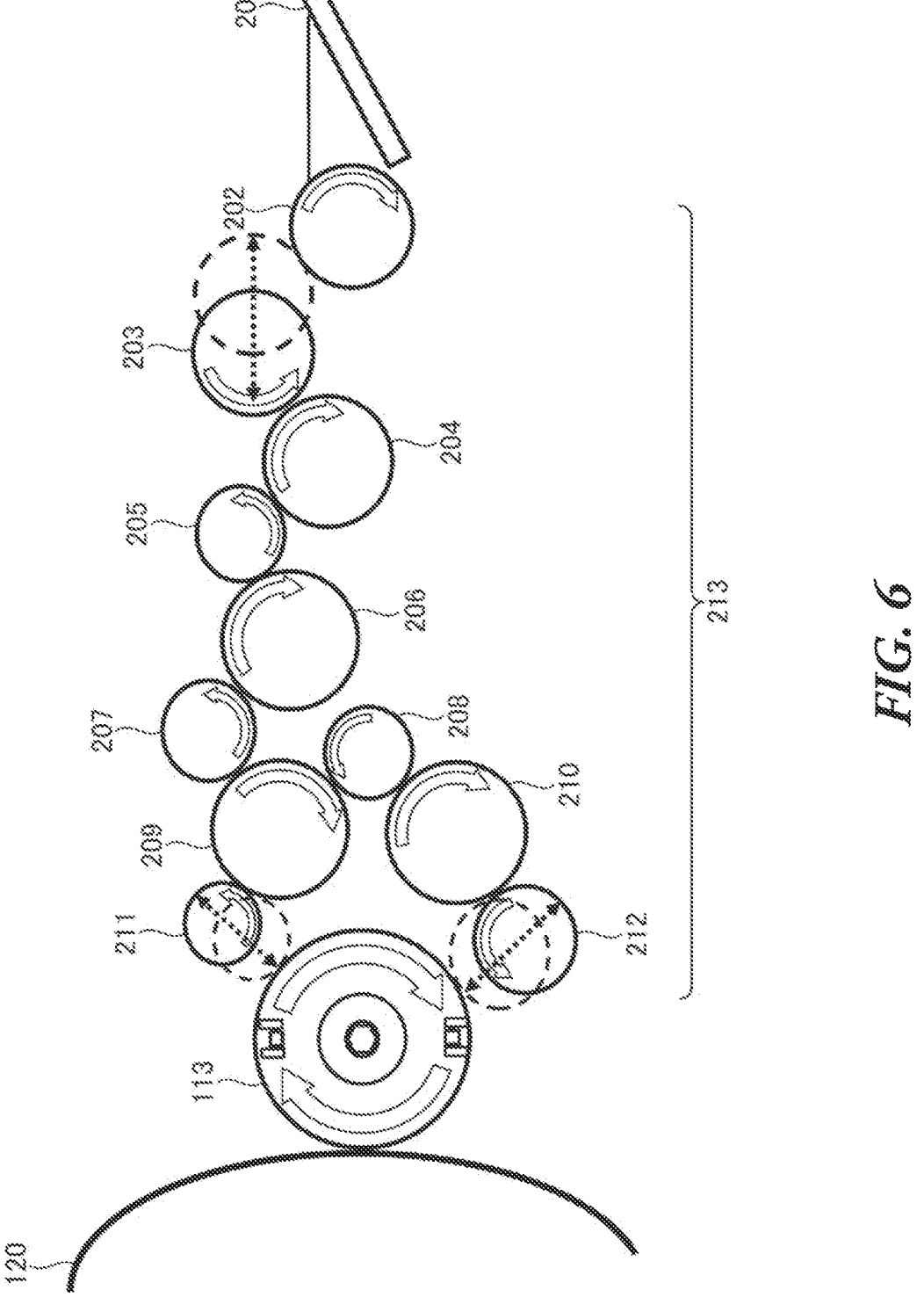
FIG. 6 illustrates the schematic configuration of an example of an ink supply part of the printing device illustrated in FIG. 5.

As illustrated in FIG. 6, the ink supply part 111 includes an ink roller group 213 between an ink storage part (ink reservoir) 201 and the plate cylinder 113. The ink roller group 213 is constituted by a fountain roller 202, a ductor roller 203, a fountain roller 204, a distributor roller 205, a vibrator roller 206, distributor rollers 207 and 208, vibrator rollers 209 and 210, and foam rollers 211 and 212, and they are arranged in this order.

In this ink roller group 213, the fountain roller 202 to the fountain roller 204 have the function to supply the ink from the ink storage part 201. The distributor roller 205 to the foam rollers 211 and 212 mainly have the function to uniform the ink supplied to the printing plate 114.

The rollers of the ink roller group 213 rotate to supply the ink in the ink storage part 201 to the printing plate 114 mounted on the plate cylinder 113. The ductor roller 203 moves forward and backward between the contact point with the fountain roller 202 and the contact point with the fountain roller 204 to receive the ink from the fountain roller 202 and deliver the ink to the fountain roller 204.

In addition, the duty ratio at which the ductor roller 203 contacts the fountain roller 202 is controlled to control the print density. The ductor roller 203 is divided into the plurality of rollers in the axial direction, and the divided rollers individually move forward and backward. By this means, it is possible to adjust the amount of ink supply for each of the divided rollers and control the print density. Temperature-controlled water is circulated in part of the rollers of the ink roller group 213 to appropriately keep the temperature of the ink.

<Imaging Device>

Figure 7B:
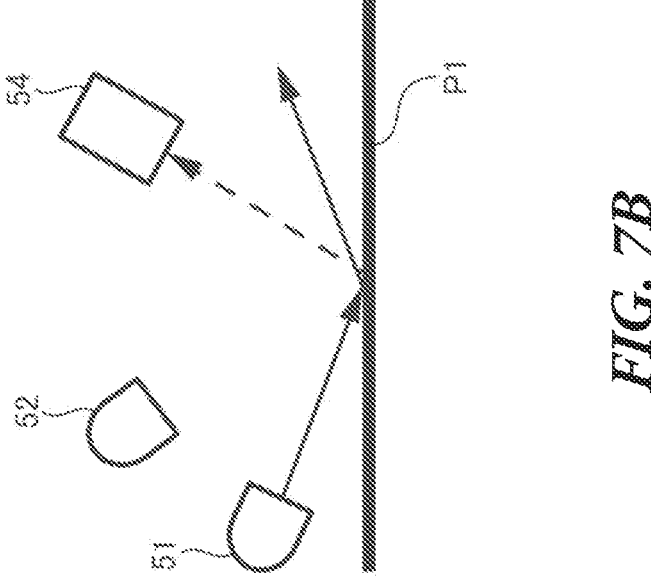
FIGS. 7A and 7B each illustrate the schematic configuration of an example of an imaging device.
Figure 7A:
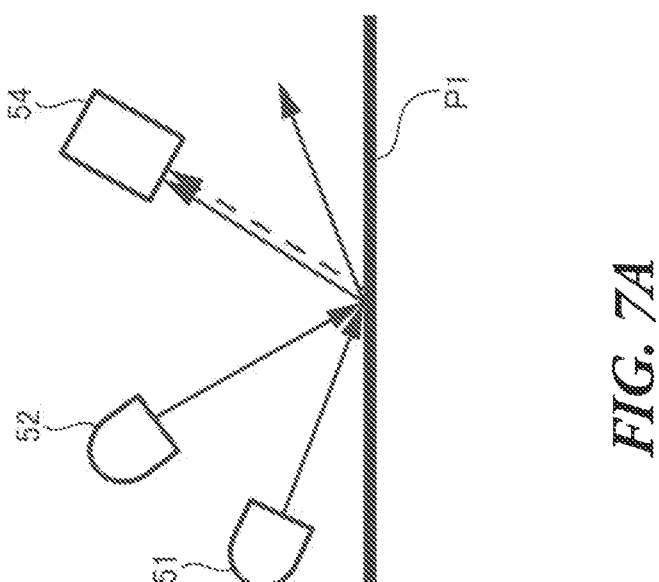

An example of the imaging device 50 will be described. The imaging device 50 illustrated in FIGS. 7A and 7B includes a first light source 51, a second light source 52, and a line sensor 54. In FIGS. 7A and 7B, solid lines indicate regularly reflected light, and broken lines indicate irregularly reflected light.

The first light source 51 is disposed in a position at which the light emitted from the first light source 51 is irregularly reflected from an inspected object surface P1 at an angle with respect to the line sensor 54. The second light source 52 is disposed in a position at which the light emitted from the second light source 52 is regularly reflected from the inspected object surface P1 with respect to the line sensor 54.

In FIGS. 7A and 7B, the first light source 51 emits the light at one angle. However, it is preferred that a plurality of light sources are used to emit the light at different angles.

FIG. 7A illustrates an example where the first light source 51 and the second light source 52 are turned on, so that the reflected light including the regularly reflected light and the irregularly reflected light from the inspected object surface P1 is received by the light sensor 54 to acquire the first image data. The use of the first image data is effective to inspect the printed state of the regions of the inspected object surface in colors other than white. That is, by inspecting the printed state based on a first L* value acquired from the first image data, it is possible to correctly get the printed state (the film thickness of the ink) of the regions of the inspected object surface in colors other than white.

In FIG. 7B, the first light source 51 is turned on, the second light source 52 is turned off, and only the irregularly reflected light from the inspected object surface P1 is received by the line sensor 54 to acquire the second image data. The use of the second image data is effective to inspect the printed state of the region of the inspected object surface in white. That is, by inspecting the printed state based on a second L* value acquired from the second image data, it is possible to correctly get the printed state (the film thickness of the ink) of the region of the inspected object surface in white. Here, to image the inspected object surface P1, various sensors capable of acquiring the inspection image data, for example, an area sensor and a camera can be used, as well as the line sensor 54.

Figure 8:
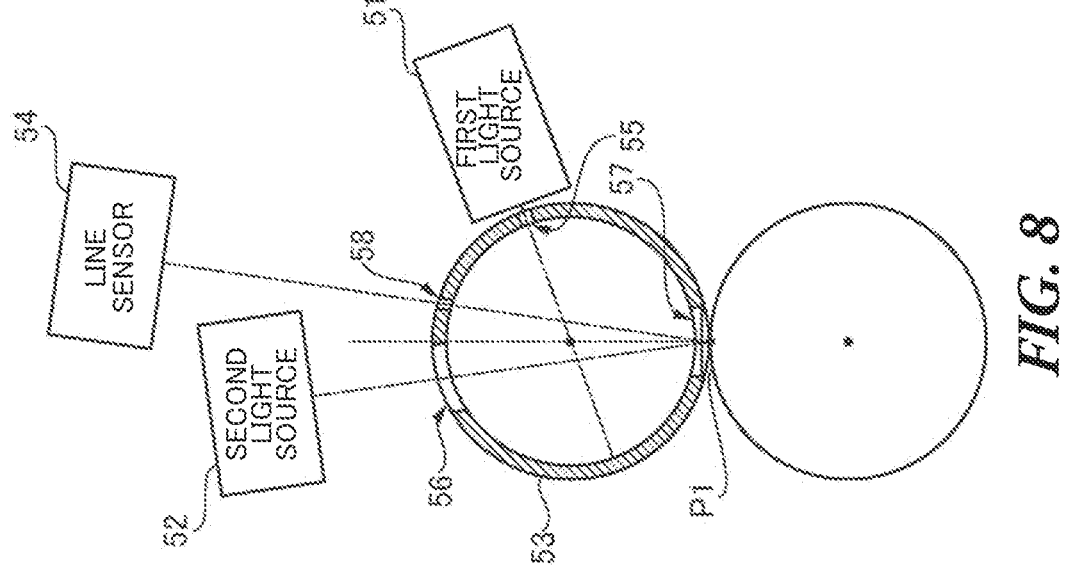
FIG. 8 illustrates the schematic configuration of another example of the imaging device.

As illustrated in FIG. 8, the imaging device 50 may include a diffuser 53. With the example illustrated in FIG. 8, the first light source 51 is disposed such that the light emitted from the first light source 51 is diffusely reflected in the diffuser 53. The second light source 52 is disposed such that the light emitted from the second light source 52 passes through the diffuser 53 and is regularly reflected from the inspected object surface P1 to the line sensor 54.

The diffuser 53 is a hollow cylinder such as a circular cylinder, and at least part of the inner peripheral surface of the diffuser 53 includes a curved surface having the center of curvature on the central axis of the diffuser 53. The inner peripheral surface of the diffuser 53 is evenly covered with a diffuse reflective material, and functions as a substitute for a so-called integrating sphere. The diffuse reflective material is white paint or material having a high diffuse reflection factor, and for example, barium sulphate, or polytetrafluoroethylene (PTFE) is applicable. It is preferred that also the inner side of the bottom surface of the diffuser 53 is evenly covered with the diffuse reflective material.

The diffuser 53 includes a port 55 configured to direct the light emitted from the first light source 51, a port 56 configured to direct the light emitted from the second light source 52, a port 57 configured to direct the diffusely reflected light in the diffuser 53 or the direct light passing through the diffuser 53 to the inspected object surface P1, and a port 58 configured to direct the light reflected from the inspected object surface P1 to the line sensor 54.

The diffuser 53 is disposed such that the longitudinal direction of the diffuser 53 is approximately parallel to the axial direction of the can body P having the inspected object surface P1.

The light emitted from the first light source 51 enters the diffuser 53 via the port 55, and diffusely reflected from the inner peripheral surface, and then illuminates the inspected object surface P1 via the port 57.

The light emitted from the second light source 52 passes through the diffuser 53 via the port 56 as direct light, and illuminates the inspected object surface P1 via the port 57.

The line sensor 54 can receive the irregularly reflected light resulting from reflecting the diffusely reflected light from the inspected object surface P1, and receive the regularly reflected light resulting from regularly reflecting the direct light emitted from the second light source 52, from the inspected object surface P1.

In the imaging device 50 configured as described above, the first light source 51 and the second light source 52 are turned on. By this means, the reflected light including the irregularly reflected light which is emitted from the first light source 51, passes through the diffuser 53, and is reflected from the inspected object surface P1 and the regularly reflected light which is emitted from the second light source 52 and reflected from the inspected object surface P1 are received by the line sensor 54 to acquire the first image data.

Moreover, the first light source 51 is turned on, and the second light source 52 is turned off. By this means, the light is emitted from the first light source 51 and diffusely reflected in the diffuser 53, and only the irregularly reflected light from the inspected object surface P1 is received by the line sensor 54 to acquire the second image data. In this case, the port 56 of the diffuser 53 is located to make regular reflection with respect to the line sensor 54, and therefore the diffusely reflected light does not contain regular reflection component. Consequently, the line sensor 54 receives only the irregularly reflected light.

As described above, the inspection device 10 of the printing system 1 according to the present embodiment measures the L* value for each of the colors in the L*a*b* colorimetric system of the inspection image data obtained by imaging the inspected object. In the inspection, the correlation between the L* value and the film thickness of the ink is determined for each of colors, and therefore it is possible to perform the inspection depending on the printed contents (colors) of the inspected object surface, and consequently to correctly get the printed state of the inspected object surface. Moreover, it is possible to use appropriate image data from the first image data and the second image data as the inspection image data, depending on the printed contents (colors) of the inspected object surface. By this means, it is possible to correctly get the printed state depending on the printed contents even though it is difficult for the color to determine the correlation between the L* value and the film thickness of the ink.

OTHERS

The above-described embodiments including a modification may apply their features to each other. The above-described embodiments are not intended to limit the subject matter of the invention but may be modified to the extent not to depart from the scope of the claims.

According to the invention, it is possible to correctly get the printed state of the inspected object surface.

The invention claimed is:

1. An inspection device configured to inspect a printed state of an inspected object surface which is a printed metallic base, the inspection device comprising:
a processor; and
a memory connected to the processor to be able to communicate with the processor,
the processor being configured to:
acquire inspection image data obtained by imaging the inspected object surface;
measure an L* value for each of colors in an L*a*b* colorimetric system of the inspection image data; and
inspect the printed state of the inspected object surface based on a difference value ΔL* between the L* value of the Lab* colorimetric system of standard image data as an inspection standard and the L* value of the Lab* colorimetric system of the inspection image data.

2. The inspection device according to one of claim 1, wherein:
the inspection image data is first image data obtained by irradiating the inspected object surface with light emitted from a light source, and receiving reflected light including regularly reflected light and irregularly reflected light from the inspected object surface by a line sensor; and
the processor is further configured to inspect the printed state of the inspected object surface, based on first L* value of the first image data.

3. The inspection device according to claim 2, wherein the processor is further configured to inspect the printed state of a region of the inspected object surface based on the first L* value, the region being printed in at least colors other than white.

4. The inspection device according to one of claim 1, wherein:
the inspection image data is second image data obtained by irradiating the inspected object surface with light emitted from a light source, and receiving only irregularly reflected light from the inspected object surface by a line sensor; and
the processor is further configured to inspect the printed state of the inspected object surface, based on second L* value of the second image data.

5. The inspection device according to claim 4, wherein the processor is further configured to inspect the printed state of a region of the inspected object surface based on the second L* value, the region being printed in at least white.

6. The inspection device according to claim 1, wherein the inspection image data includes:
first image data obtained by irradiating the inspected object surface with light emitted from a light source, and receiving reflected light including regularly reflected light and irregularly reflected light from the inspected object surface by a line sensor; and
second image data obtained by irradiating the inspected object surface with light emitted from a light source, and receiving only irregularly reflected light from the inspected object surface by the line sensor, and
the processor is further configured to inspect the printed state of the inspected object surface based on a first L* value of the first image data and a second L* value of the second image data.

7. The inspection device according to claim 2, wherein:
at least part of the inspected object surface is a curved surface protruding to the light source; and
the processor is further configured to inspect the printed state of the inspected object surface by rotating the inspected object surface around a center of curvature of the curved surface as a rotation axis.

8. An inspection method for inspecting a printed state of an inspected object surface which is a printed metallic base, the inspection method comprising:
acquiring inspection image data obtained by imaging the inspected object surface;
measuring an L* value for each of colors in an L*a*b* colorimetric system of the inspection image data; and
inspecting the printed state of the inspected object surface based on a difference value ΔL* between the L* value of the Lab* colorimetric system of standard image data as an inspection standard and the L* value of the Lab* colorimetric system of the inspection image data.

* * * * *